(12) United States Patent
Marcora et al.

(10) Patent No.: US 12,410,268 B2
(45) Date of Patent: Sep. 9, 2025

(54) METHOD FOR PRODUCING LOW MOLECULAR WEIGHT POLYTETRAFLUOROETHYLENE (PTFE), LOW MOLECULAR WEIGHT PTFE AND COMPOSITION

(71) Applicant: GUARNIFLON S.P.A., Castelli Calepio (IT)

(72) Inventors: Giovanni Marcora, Castelli Calepio (IT); Alberto Farimbella, Castelli Calepio (IT); Camillo Zarantonello, Castelli Calepio (IT)

(73) Assignee: GUARNIFLON S.P.A., Castelli Calepio (IT)

( * ) Notice: Subject to any disclaimer, the term of this patent is extended or adjusted under 35 U.S.C. 154(b) by 614 days.

(21) Appl. No.: 17/783,620

(22) PCT Filed: Dec. 21, 2020

(86) PCT No.: PCT/IB2020/062305
§ 371 (c)(1),
(2) Date: Jun. 8, 2022

(87) PCT Pub. No.: WO2021/124311
PCT Pub. Date: Jun. 24, 2021

(65) Prior Publication Data
US 2022/0389134 A1    Dec. 8, 2022

(30) Foreign Application Priority Data
Dec. 19, 2019 (IT) .......................... 102019000024871

(51) Int. Cl.
*C08F 114/26* (2006.01)
*C08J 3/28* (2006.01)

(52) U.S. Cl.
CPC .............. *C08F 114/26* (2013.01); *C08J 3/28* (2013.01); *C08J 2327/18* (2013.01)

(58) Field of Classification Search
None
See application file for complete search history.

(56) References Cited

U.S. PATENT DOCUMENTS 7,709,566 B2    5/2010   Hoshikawa et al.
10,793,650 B2 *  10/2020  Yoshida .................. C08K 5/01
(Continued)

FOREIGN PATENT DOCUMENTS

EP   3388472 A1   10/2018
EP   3733742 A1   11/2020
(Continued)

OTHER PUBLICATIONS

WO 2019156053 A1, 2019, machine translation (Year: 2019).*

*Primary Examiner* — Satya B Sastri
(74) *Attorney, Agent, or Firm* — James S. Keddie; Bozicevic, Field & Francis LLP

(57) ABSTRACT

A method for obtaining low molecular weight polytetrafluoroethylene (PTFE) comprising the following steps: provision of high molecular weight PTFE; arrangement of said high molecular weight PTFE in a chamber, delimited by a gas barrier and containing a controlled atmosphere with an amount of oxygen comprised from 0.005% to 0.5% by volume; hermetically sealing of said chamber containing said high molecular weight PTFE; irradiating said PTFE into said hermetically sealed chamber to obtain said low molecular weight PTFE.

16 Claims, 6 Drawing Sheets

(56) References Cited

U.S. PATENT DOCUMENTS 11,028,239 B2 * 6/2021 Tsuji .......................... C08J 3/28
12,227,608 B2 * 2/2025 Higashi ................. C08F 114/26

FOREIGN PATENT DOCUMENTS

WO    WO 2019/156065 A1    8/2019
WO    WO-2019156053 A1 *    8/2019    ............ C08F 114/26

* cited by examiner

METHOD FOR PRODUCING LOW MOLECULAR WEIGHT POLYTETRAFLUOROETHYLENE (PTFE), LOW MOLECULAR WEIGHT PTFE AND COMPOSITION

CROSS-REFERENCE TO RELATED APPLICATIONS

This application is a § 371 national phase of International Application No. PCT/IB2020/062305, filed on Dec. 21, 2020, which claims the benefit of Italian Application No. 102019000024871, filed on Dec. 19, 2019, all of which applications are incorporated by reference herein.

The present invention relates to a method for obtaining low molecular weight polytetrafluoroethylene (PTFE).

Furthermore, the present invention relates to low molecular weight PTFE obtained by means of the method of the present invention.

Furthermore, the present invention also relates to a composition containing said low molecular weight PTFE.

Low molecular weight polytetrafluoroethylene (PTFE) is a polymer having excellent chemical stability which is used in numerous industries such as automotive, electronics, lubricants, inks, medical industry and the like. PTFE is often used as an additive in the plastic and cosmetic industry, for example to improve the surface characteristics of the coatings, and the performance characteristics of the formulations.

Nowadays, there are various methods for producing low molecular weight PTFE starting from higher molecular weight PTFE, among which the most common method is radiolysis. Such method has the main advantage of obtaining low molecular weights starting from various degrees of standard PTFE and obtained in any manner (both from emulsion and from suspension), at a relatively low cost, managing to reach much lower molecular weights with respect to the other techniques known to date, thus facilitating the subsequent micronisation and classification steps.

Nevertheless, one of the problems observed in the method for producing low molecular weight PTFE by means of radiolysis is the formation of perfluorocarboxylic acids and salts thereof, which are formed during the irradiation process. Said acids or salts thereof are sometimes defined, for the sake of brevity, as perfluorinated alkylated substances (PFAS).

In the last 15 years particular attention has been paid to the presence of C8-C14 perfluorocarboxylic acids, in particular perfluorooctanoic acid (PFOA), in consumer products, due to the marked bioaccumulation capacity of said acids. In 2006, the Environmental Protection Agency (EPA) created the "PFOA Stewardship Program" (https://www.epa.gov/assessing-and-managing-chemicals-under-tsca/fact-sheet-20102015-pfoa-stewardship-program) in which the major companies producing fluorinated compounds were involved, with the aim of reducing emissions and production of chemical compounds containing PFOA and derivatives thereof. More specifically, the new ECHA Regulation No. 2017/1000 (https://eur-lex.europa.eu/legal-content/EN/TXT/?uri=CELEX%3A32017R1000) established that, as from 4 Jul. 2020, neither PFOA nor the salts thereof nor PFOA-related substances may be produced or placed on the market in other substances exceeding predetermined quantities.

In this regard, the prior art document EP3385309 discloses a method for producing low molecular weight PTFE by means of irradiation in air; such method includes a step for purification by heating the polymer to eliminate the perfluorocarboxylic acids generated during the irradiation process.

However, such method known from the prior art document EP3385309 has the disadvantage of generating PFAS during the irradiation process, so that such compounds must be subsequently removed from the PTFE by means of purification.

The prior art document WO2019/156039A1 proposes an alternative method for producing low molecular weight PTFE in which, in the absence of oxygen, the high molecular weight PTFE is subjected to irradiation in the presence of a halogenated polymer, preferably polychlorotrifluoroethylene (PCTFE), so that said halogenated polymer binds as a terminal to the perfluorinated radicals which are formed during the fragmentation of the chains of high molecular weight PTFE.

One of the disadvantages of the method known from the prior art document WO2019/156039A1 is the use of a further halogenated compound in the production process, which could be incorporated in the low molecular weight PTFE. Among the negative effects that the presence of non-fluorinated halogens in low molecular weight PTFE may entail in this method, include application difficulties with respect to the products currently present on the market, environmental and efficiency disadvantages, and cost-related disadvantages.

Prior art document WO 2019/0156053 A1 discloses a process in which a high molecular weight PTFE and a mixed gas are placed in a sealed container prior to an irradiation step to obtain low molecular weight PTFE. The mixed gas comprises oxygen at an amount comprised from 1% to 10% by volume with respect to the total volume of said gas.

Example 1 of WO 2019/0156053 A1 discloses a nylon bag used as a sealed container, wherein the amount of oxygen in the various tests conducted (Table 1) is always equal to or greater than 1% by volume.

Prior art document WO 2019/156065 A1 discloses a method for producing a composition containing a low molecular weight polytetrafluoroethylene, wherein said method comprises a step (I) of exposing a high molecular weight polytetrafluoroethylene to ionising radiations to obtain a composition containing a low molecular weight polytetrafluoroethylene, and a step (II) in which the composition obtained from step (I) is subjected to at least one treatment selected from a cleaning treatment, a steam treatment and a low pressure treatment.

Thus, in WO 2019/156065 A1 there is allowed a formation of PFOA by exposing the high molecular weight PTFE to ionising radiations in air, and a removal of such PFOA is subsequently conducted by means of the aforementioned treatments.

Prior art document EP3388472A1 discloses a method for producing low molecular weight polytetrafluoroethylene comprising a supply of PTFE into a sealed container, in the presence of hydrocarbons, chlorinated hydrocarbons, alcohols and carboxylic acids other than C8-C14 perfluorinated carboxylic acids, oxygen adsorbents and an inert gas, and a subsequent irradiation step to obtain low molecular weight PTFE. The sealed container substantially does not contain oxygen, a tolerated amount of oxygen being equal to or less than 0.1% by volume. In example 1, a nylon barrier bag loaded with 100 g of PTFE and an iron-based oxygen adsorbent is used, such bag being subsequently heat-sealed and irradiated.

The document EP3388472A1 requires the presence of oxygen additives and adsorbents, and it does not explain what type of barrier the nylon bag should offer.

In the light of the above, it is clear that there is the need to find novel methods of production of low molecular weight PTFE which allow to keep the chemical and chemical/physical properties unchanged, and at the same time allow to reduce—ab initio—the production of PFAS, in particular PFOA or of the salts thereof.

After a long and intense research and development activity, the Applicant developed a method for obtaining low molecular weight PTFE capable of providing an adequate response to the existing limits, drawbacks and problems, in particular, by providing a method for the production of low molecular weight PTFE with a low content of perfluorocarboxylic acids, and of salts thereof, with respect to the methods of the prior art, and capable of keeping the chemical and chemical/physical characteristics of the low molecular weight PTFE obtained by means of said method unchanged.

Thus, forming an object of the present invention is a method for obtaining low molecular weight PTFE, having the characteristics as defined in the attached claims.

In addition, forming an object of the present invention is a low molecular weight PTFE, preferably obtained by means of said method, having the characteristics as defined in the attached claims.

In addition, forming an object of the present invention are a composition containing said low molecular weight PTFE, having the characteristics as defined in the attached claims.

Figure 1:
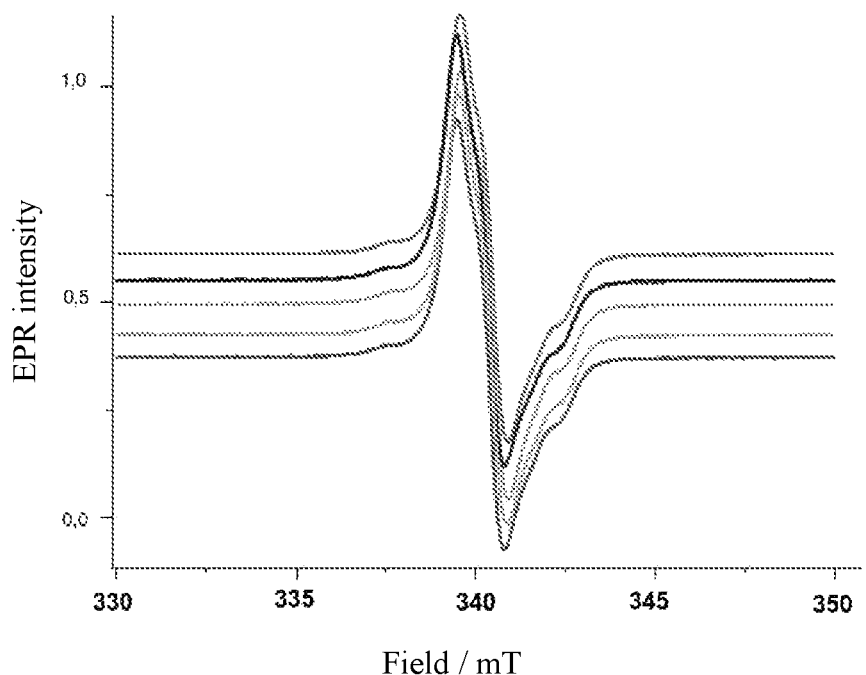
FIG. 1 shows a normalised CW-EPR spectra of five samples of PTFE acquired at room temperature prior to the thermal treatment.

Thus, forming an object of the present invention is a method for obtaining low molecular weight polytetrafluoroethylene (PTFE). Such method comprises the following steps:
provision of high molecular weight PTFE;
arrangement of said high molecular weight PTFE in a chamber, delimited by a gas barrier and containing a controlled atmosphere with an amount of oxygen comprised from 0.005% to 18% by volume (for example, said amount being measured by means of a galvanic cell oxygen meter/analyser with and/or provided with $O_2$ sensor containing Zirconium, at a temperature of 25° C.), preferably comprised from 0.2% and 17% by volume;
hermetical closure of said chamber containing said high molecular weight PTFE;
irradiation of said PTFE in said hermetically closed chamber to obtain said low molecular weight PTFE.

Furthermore, forming an object of the present invention is a method for obtaining low molecular weight polytetrafluoroethylene (PTFE) comprising the following steps:
provision of high molecular weight PTFE;
arrangement of said high molecular weight PTFE in a chamber, delimited by a gas barrier and containing a controlled atmosphere with an amount of oxygen comprised from 0.005% to 0.5% by volume (said amount being preferably measured by means of a galvanic cell oxygen meter/analyser and/or Zirconium $O_2$ sensor, at a temperature of 25° C., more preferably by means of a Zirconium $O_2$ sensor), wherein said gas barrier has an oxygen permeability≤0.5 cc/m2/24h (ASTM D3985-95, 23° C.—0% RH) and a water vapour permeability≤2 cc/m2/24h (ASTM F1249-90, 38° C.—90% RH);
hermetical closure of said chamber containing said high molecular weight PTFE;
irradiation of said PTFE in said hermetically closed chamber to obtain said low molecular weight PTFE.

According to an innovative aspect of the present invention, said method for producing low molecular weight PTFE by means of irradiation of high molecular weight PTFE was designed with the intention of reducing upstream the formation of perfluorocarboxylic acids, contrary to the approaches of the prior art which provide for the formation of said acids and the subsequent purification thereof.

Surprisingly, the inventors of the present invention found that it is not possible to obtain PTFE with a sufficiently low molecular weight in the presence of an atmosphere with an oxygen volume content lower than the lower threshold identified herein. A possible explanation of this phenomenon could lie in the fact that the perfluoroalkyl radicals formed during irradiation, are more likely to recombine with each other again to obtain further high molecular weight PTFE, instead of reacting with oxygen. A further possible explanation could be the decrease in the oxidative phenomena in the presence of a too low amount of oxygen since $O_2$ reacts with the radio-induced radicals. On the other hand, an atmosphere with an oxygen content higher than the upper threshold identified herein (for example 0.5% by volume) corresponds to an irradiation in air, therefore entails expensive processes for the purification of low molecular weight PTFE from PFOA and PFAS, downstream of the irradiation.

Equally surprisingly, the inventors of the present invention have found that not all gas barriers are suitable to limit the formation of PFOA and PFAS, and they understood that suitable barriers must be able to prevent oxygen and humidity from flowing through the chamber surfaces.

In the present description, the expression "high molecular weight" is used to indicate a PTFE having an average molecular weight equal to or greater than $2.8 \times 10^5$, determined by means of an indirect method, applying the formula of Suwa (J. Appl. Polymer Sci., 17, 3253, 1973), with a melting point comprised in the range from 336° C. to 348° C., determined according to the ASTM D 4591 standard in force at the priority date of the present patent application. By way of example, said melting point could be determined with a "DSC 3" instrument (Mettler-Toledo).

The high molecular weight PTFE is preferably selected from a virgin PTFE from suspension or from dispersion, virgin PTFE from suspension or from dispersion with at least one additive free of PFOA (PFOA-free), a regenerated PTFE from suspension or from dispersion, a regenerated PTFE from suspension or from dispersion with at least one PFOA-free additive.

In this description the expression "PFOA-free additive" is used to indicate a PTFE polymer (virgin or regenerated) corresponding to the high molecular PTFE but having a lower molecular weight (i.e. low molecular weight). PFOA-free additives of various kinds are available on the market. For example, PFOA free additives are obtained according to the method discussed in the prior art document EP3385309, or according to the method subject of the present invention.

Preferably, the PFOA-free additive is present at an amount comprised from 10% by weight to 20% by weight with respect to the total weight of said PTFE (virgin or regenerated).

Preferably, the high molecular weight PTFE is in the form of powder or (micro-)particles, preferably with an average particle size distribution comprised from 20 μm to 700 μm, more preferably comprised from 50 μm to 500 μm, even more preferably comprised from 100 μm to 300 μm, determined according to the ISO 13320 standard in force at the priority date of the present patent application. For example, the average particle size distribution is a mean volumetric diameter (D50) measured by means of laser scattering, specifically measurable by means of a multi-range Sympatec HELOS/KR instrument, using a RODOS/M dispersion system (6.0 mm-injector, 1.5 2.0 bar primary pressure), with an R3/R5 lens and a FREE-1 processing method.

In the method subject of the present invention, subsequently to the step of provision of said high molecular weight PTFE, said high molecular weight PTFE is placed in said chamber.

In a first embodiment, said high molecular weight PTFE is placed in said chamber together with a gas flow or composition corresponding to said controlled atmosphere. In other words, according to such embodiment, the gas flow or composition is introduced into said chamber simultaneously with the high molecular weight PTFE.

In other embodiments, said controlled atmosphere is created in said chamber prior to or subsequently to said step of arrangement of said high molecular weight PTFE into said chamber, in any case before the step of irradiation of said PTFE in said chamber.

Preferably, said high molecular weight PTFE is placed in said chamber in the presence of (atmospheric) air, after which said chamber is brought to low pressure (for example by means of a vacuum system communicating with such chamber), and a gas flow or composition corresponding to said controlled atmosphere is subsequently caused to flow into said chamber.

Preferably, said gas barrier has an oxygen permeability≤0.5 cc/m2/24h (determined by means of ASTM D3985-95 (23° C.-0% RH)), preferably ≤0.3 cc/m2/24h, even more preferably ≤0.1 cc/m2/24h, and/or a water vapour permeability≤2 cc/m2/24h (determined by means of ASTM F1249-90 (38° C.-90% RH)), preferably ≤1 cc/m2/24h, even more preferably ≤0.1 cc/m2/24h.

More preferably, said gas barrier has an oxygen permeability≤0.1 cc/m2/24h and a water vapour permeability≤0.1 cc/m2/24h; or an oxygen permeability≤0.2 cc/m2/24h and a water vapour permeability≤2 cc/m2/24h; or an oxygen permeability≤0.1 cc/m2/24h and a water vapour permeability≤2 cc/m2/24h.

Even more preferably, said gas barrier comprises at least one metal layer and/or one metalized polymeric layer, even more preferably an aluminium layer and/or a polymeric layer metallised with aluminium. By way of example, said gas barrier may be connected to, or integrated in, a bag, or a container or a chamber wall—preferably flexible—delimiting said chamber.

The bag, or the container, or the chamber wall may preferably consist of one or more coupled layers (for example, joined together by an adhesive or a sealing) each having a thickness independently comprised from 0.1 μm and 5000 μm, preferably from 1 μm to 2000 μm, even more preferably from 10 μm to 1000 μm.

The bag, container or chamber wall preferably consists of a multilayer film, more preferably, a multilayer film comprising at least one heat-sealable polymer layer.

More precisely, said bag, said container or said chamber wall preferably comprises or, alternatively, consists of two layers (for example: polymer layer-barrier layer), or three layers (for example: polymer layer-barrier layer-polymer layer), or four layers (for example: polymer layer-barrier layer-polymer layer-polymer layer).

More preferably, said polymer layer is independently selected from the group comprising or, alternatively, consisting of polyethylene (PE), polypropylene, polyethylene terephthalate (PET), polyester, polyamide, oriented polyamide (OPA), linear polyethylene, medium density polyethylene, polyethylene vinyl alcohol, biaxially oriented polypropylene, non-oriented polypropylene (OPP), low density polyethylene (LDPE), linear low-density polyethylene (LLDPE).

Even more preferably, said bag, said container or said chamber wall preferably comprises or, alternatively, consists of a coextruded film:
 (a) linear polyethylene, medium density polyethylene and polyethylene vinyl alcohol (EVOH), or
 (b) polyethylene vinyl alcohol (EVOH) and non-oriented polypropylene, or
 (c) polyethylene vinyl alcohol (EVOH) and biaxially oriented polypropylene.

Preferably, said bag, said container or said chamber wall preferably comprises or, alternatively, consists of:
 (d) oriented polyamide (preferably ≤15 μm)-aluminium (preferably ≤6.35 μm)-coextruded LLDPE-LDPE (preferably ≤100 μm); or
 (e) PET (preferably ≤12 μm)-aluminium (preferably ≤6.35 μm)-PET (preferably ≤12 μm)-OPP (preferably ≤75 μm); or
 (f) PET (preferably ≤12 μm)-aluminium (preferably ≤6.35 μm)-OPA (preferably ≤15 μm)-coextruded PE, medium density linear-PE (preferably ≤130 μm); or
 (g) OPP (preferably ≤20 μm)-coextruded LLDPE-LDPE (preferably ≤55 μm); or (h) OPP (preferably ≤20 µm)-metallised biaxially oriented polypropylene (MOPP) (preferably ≤20 µm); or (i) PET (preferably ≤12 µm)-aluminium (preferably ≤6.35 µm)-PE (preferably ≤90 µm);

where the values in brackets indicate the preferred thicknesses for each layer, expressed in micrometres (µm).

Preferably, in the controlled atmosphere, said amount of oxygen is comprised from 0.25% to 15% by volume, more preferably comprised from 0.5% to 10% by volume.

More preferably, said amount of oxygen is comprised from 0.005% to 0.5% by volume, preferably comprised from 0.005% to 0.25%, more preferably comprised from 0.005% to 0.2%, even more preferably comprised from 290 ppm to 450 ppm, further preferably comprised from 300 ppm to 380 ppm.

Besides said amount of oxygen, said controlled atmosphere preferably contains an inert gas (for example nitrogen or helium, more preferably nitrogen).

Said controlled atmosphere is preferably free of halogen gases, more preferably free of halogenated polymers, free of oxygen adsorbents, and free of hydrocarbons, chlorinated hydrocarbons, alcohols and carboxylic acids other than C8-C14 perfluorinated carboxylic acids.

Thus, the controlled atmosphere preferably comprises or, alternatively, consists of:

said amount of oxygen comprised from 0.005% to 18% by volume, preferably comprised from 0.2% to 17% by volume, more preferably comprised from 0.25% to 15% by volume, even more preferably comprised from 0.5% to 10% by volume; or said amount of oxygen is comprised from 0.005% to 0.5% by volume, preferably comprised from 0.005% to 0.25%, more preferably comprised from 0.005% to 0.2%, even more preferably comprised from 290 ppm to 450 ppm, further preferably comprised from 300 ppm to 380 ppm;

an inert gas, for example nitrogen or helium, more preferably nitrogen;

said atmosphere being preferably free of halogen gases, more preferably free of halogenated polymers, free of oxygen adsorbents, and free of hydrocarbons, chlorinated hydrocarbons, alcohols and carboxylic acids other than C8-C14 perfluorinated carboxylic acids.

In the present method, subsequently to the step of provision of said high molecular weight PTFE and the step of arrangement of said high molecular weight PTFE into said chamber, said chamber is hermetically closed.

In the present description, the expression "hermetical closure" is used to indicate the creation of a substantial impediment to the exchange, gaseous or matter, of said chamber with respect to an environment outside said chamber.

Preferably, the closure step comprises a sealing, occlusion, welding, gluing, and/or heat-sealing step.

More preferably, in the optional heat-sealing step, the at least one polymer layer of the multilayer film could be heat-sealed, i.e. brought above its softening temperature, and subsequently solidified at contact with another polymer layer of said bag, or of said container or of said chamber wall.

In the present method, subsequently to the step of provision of said high molecular weight PTFE, the step of arrangement of said high molecular weight PTFE in said chamber and the step of hermetical closure of said chamber, said high molecular weight PTFE is irradiated to obtain low molecular weight PTFE.

The expression "low molecular weight" is used to indicate a PTFE with an average molecular weight comprised from $1\times10^2$ a $1\times10^5$. The average molecular weight is determined by means of the indirect method (Suwa formula) mentioned in relation to the high molecular weight.

Therefore, during the irradiation step, the molecular weight of the high molecular weight PTFE is reduced, thus obtaining the low molecular weight PTFE.

In the present description, the expression "decrease in the molecular weight" means a decrease in the molecular weight of the starting high molecular weight PTFE from 2 to 3000 times, preferably from 5 to 1500 times.

According to a first embodiment, said irradiation step is carried out inside said chamber, i.e. with an irradiation source capable of irradiating in said chamber, without the interposition of filters or barriers.

According to a second embodiment, said step of irradiating said PTFE in said chamber is preferably carried out through said gas barrier, specifically so as to dampen an irradiating incident on said high molecular weight PTFE.

Preferably, one or more conventional ionising radiation sources, for example electron beams, UV rays, gamma rays, X-rays, neutron beams, and high energy ions, may be used in the irradiation step. Gamma rays and electron beams are particularly preferred embodiments respectively for medium-low (lower than 400 kGy) and high (higher than 800 kGy) exposure doses.

In the irradiation step, a high molecular weight PTFE exposure dose is preferably comprised from 5 kGy to 2000 kGy, more preferably comprised from 25 kGy to 1600 kGy, even more preferably comprised from 50 kGy to 1000 kGy, further preferably comprised from 75 kGy to 900 kGy, for example 100 kGy, 200 kGy, 400 kGy, 600 kGy, or 800 kGy.

Preferably, in the step for irradiating said PTFE in said hermetically closed chamber, irradiation rates comprised from 5 kGy/h to 250 kGy/h, preferably comprised from 10 kGy/h to 150 kGy/h, even more preferably comprised from 50 kGy/h to 100 kGy/h, are used.

More preferably, in the step of irradiating said PTFE in said hermetically closed chamber, doses or irradiation energies of the irradiation source equal to or lesser than 7 MeV, preferably comprised from 0.5 MeV to 7 MeV, more preferably comprised from 1 MeV to 6 MeV, even more preferably comprised from 2 MeV to 4 MeV, are used.

Preferably, the irradiation temperature may be any temperature comprised in the range from −20° C. to 300° C., preferably comprised from 0° C. to 200° C., even more preferably comprised from 10° C. to 30° C. The specified irradiation temperature should be understood immediately before or at the beginning of the irradiation step given that, as known, irradiation produces a considerable temperature increase in the high molecular weight PTFE.

Preferably, the maximum irradiation temperature is comprised from 75° C. to 120° C., more preferably comprised from 80° C. to 119° C., even more preferably comprised from 105° C. to 118° C. The specified irradiation temperature shall be understood as a maximum temperature during the irradiation step. Therefore, in the presence of an increase in temperature of the irradiated PTFE, the temperature never exceeds the indicated ranges. More preferably, when the maximum irradiation temperature is comprised from 75° C. to 120° C., preferably comprised from 80° C. to 119° C., even more preferably comprised from 105° C. to 118° C., the process subject of the present invention does not include further thermal treatments, in particular it does not include thermal—post-treatment treatments—of the product of the irradiation step In the present description, "further thermal treatments" means heating at temperatures above the maximum irradiation temperature identified herein. On the other hand, a maintenance of the PTFE irradiated at the maximum irradiation temperature or at a temperature lower than the latter is not considered a "further thermal treatment".

Preferably, so as not to exceed said maximum irradiation temperature, above all by operating with high source energies (equal to or higher than 7 MeV), the step of irradiating said PTFE in said hermetically closed chamber is carried out in pulses, or intermittently, or in irradiation steps alternating with non-irradiation steps.

The duration of the irradiation step (in short "irradiation time") is preferably comprised from 1 hour to 96 hours, more preferably comprised from 6 hours to 72 hours, even more preferably comprised from 12 hours to 60 hours, further preferably comprised from 36 hours to 55 hours, variable according to the irradiation parameters and the decrease in the molecular weight of PTFE.

Preferably, the low molecular weight PTFE obtained by means of the method of the present invention has a viscosity comprised from 2 Poise to $2 \times 10^7$ Poise, determined at 0.7 MPa, at a temperature of 380° C., extruding the low molecular weight PTFE through a nozzle having a diameter of 2.095 mm using a plastometer of the type described in the ASTM D 1238-13 standard (Ceast MF20, Instron) valid at the priority date of the present patent application, using the formula reported in the U.S. Pat. No. 3,085,083. Preferably, the low molecular weight PTFE contains a number of carboxyl groups equal to or greater than 25, at the ends of the molecular chain every $10^6$ carbon atoms on the primary chain. By way of example, said number of carboxyl groups may be determined by means of infrared spectroscopy or 19F-NMR solid layer as reported by Lappan U. in the publication Polymer (2002) "Number-average molecular weight of radiation-degraded poly(tetrafluoroethylene). An end group analysis based on solid-state NMR and IR spectroscopy", publisher Elsevier, year 2002.

Preferably, carboxyl groups were determined with a Spectrum one instrument, Perkin Elmer, in transmission, from 2075 cm-1 to 1525 cm-1, using a film obtained by compression moulding, having a thickness of 250 µm.

Preferably, the low molecular weight PTFE of the present invention is in the form of powder or (micro-) particles, preferably with an average particle size distribution comprised from 0.1 µm to 300 µm, more preferably comprised from 0.2 µm to 100 µm, even more preferably comprised from 0.3 µm to 50 µm, determined according to the ISO 13320 standard in force at the priority date of the present patent application. Preferably, the average particle size distribution is a mean volumetric diameter (D50) measured by means of laser scattering, specifically measurable by means of a multi-range Sympatec HELOS/KR instrument, using a RODOS/M dispersion system (6.0 mm-injector, 1.5-2.0 bar primary pressure), with an R3/R5 lens and a FREE-1 processing method.

Preferably, the low molecular weight PTFE in the form of powder or (micro-)particles has a specific surface area comprised from 1.0 m2/g to 15.0 m2/g, measured by means of mercury porosimeter, according to the ISO 15901-1 standard. Preferably, the specific surface area can be measured by means of a Pascal 240 instrument (Thermo-Fisher), at a maximum pressure of 75 MPa, at a temperature of 23° C.

The low molecular weight PTFE obtained by means of the method of the present invention has a low content, and preferably it is substantially free, of perfluorocarboxylic acids and salts thereof.

Preferably, said low molecular weight PTFE contains an amount of perfluorinated alkylated substances (PFAS) lower than 1000 ppb, preferably lower than 500 ppb, even more preferably lower than 100 ppb.

Preferably, said low molecular weight PTFE contains an amount of PFOA (perfluorooctanoic acid), or the salts thereof, equal to or lower than 25 ppb, preferably equal to or lower than 20 ppb, even more preferably equal to or lower than 17 ppb.

According to a particularly preferred embodiment of the present method, said high molecular weight PTFE is in the form of a powder or (micro-)particles with an average particle size distribution comprised from 20 µm to 700 µm, more preferably comprised from 50 µm to 500 µm, even more preferably comprised from 100 µm to 300 µm, said high molecular weight PTFE is irradiated in a controlled atmosphere containing, besides said amount of oxygen, an inert gas (for example nitrogen or helium), and free of halogenated polymers, at a temperature comprised from −20° C. to 300° C. and with a high molecular weight PTFE exposure dose comprised from 5 kGy to 2000 kGy, preferably from 25 kGy to 1600 kGy, and wherein said low molecular weight PTFE obtained at the end of the irradiation step is in the form of particles with an average particle size distribution comprised from 0.1 µm to 300 µm, more preferably comprised from 0.2 µm to 100 µm, even more preferably comprised from 0.3 µm to 50 µm.

Lastly, forming an object of the present invention is a composition or a substrate containing said low molecular weight PTFE. Preferably, said composition or substrate is an ink, a lubricant, an automotive component, an electronic component, a device for medical or cosmetic use or for applications intended to come into contact with food. Reported hereinafter are some examples of the present invention, provided by way of non-limiting example.

EXAMPLES

Materials and Methods

Several experiments were carried out by irradiating some high molecular weight PTFE samples at 100 kGy, under inert atmosphere using various types of sealed containers (bags).

After the introduction of the high molecular weight PTFE, the air present in the bags was removed by means of a vacuum system. High purity nitrogen was then introduced so as to create the controlled atmosphere. The bag was then sealed by welding.

The nitrogen purity grade used is: $O_2 \leq 2$ ppm, $H_2O \leq 3$ ppm, $C_nH_m \leq 0.5$ ppm. The nitrogen content used is 99.999%.

Example 1

A sample of 700 g of high molecular weight PTFE was packaged in a low-density polyethylene (LDPE) bag, using the above-mentioned apparatus, under inert nitrogen atmosphere. After irradiation treatment at 100 kGy, the sample was analysed. The analysis data are reported in Table 1 below.

TABLE 1

| | Bag material | atmosphere | Amount of PFOA + PFOS | Total amount of PFAS |
|---|---|---|---|---|
| Ex. 1 | LDPE | N2 with % O2 | 153 ppb | 1326 ppb |

Example 1.A

We proceed as in example 1, but using a nylon bag, with the same apparatus, under inert nitrogen atmosphere. The analysis data are reported in Table 1.A below.

TABLE 1.A

| Bag material | atmosphere | Amount of PFOA + PFOS | Total amount of PFAS |
|---|---|---|---|
| Ex. 1.A. | nylon | N2 with % O2 | 139 ppb | 1174 ppb |

Example 2

A sample of 398 g of high molecular weight PTFE was packaged in an LDPE bag in air (without an inert nitrogen atmosphere). This sample was analysed downstream of an irradiation process at 100 kGy. The analysis results are reported in Table 2 below.

TABLE 2

| Bag material | atmosphere | Amount of PFOA + PFOS | Total amount of PFAS |
|---|---|---|---|
| Ex. 2 | LDPE | air | 118 ppb | 928 ppb |

Example 1, Example 1.A and Example 2 above show that, irrespective of the atmosphere used, in the absence of a gas barrier, the present method is not suitable to reduce the production of undesired fluorinated products (PFOA+PFOS, and PFAS).

Example 3

A sample of 700 g of high molecular weight PTFE was packaged in a bag with various layers (PET/Al/PE): PET 12 μm/Aluminium 6.35 μm/Polyethylene 90 μm in inert nitrogen atmosphere, as discussed above. This sample was analysed after the irradiation process at 100 kGy. The analytical data obtained are reported in Table 3 below.

TABLE 3

| Bag material | atmosphere | Amount of PFOA + PFOS | Total amount of PFAS |
|---|---|---|---|
| Ex. 3 | PET/Al/PE | N2 + O2 | 6 ppb | 91 ppb |

Example 4

The low molecular weight PTFE powder of the experiment of example 3 was pulverised to an average particle size of 5 μm and once again subjected to tests to determine the PFOA and PFAS content. The data are reported in Table 4 below.

TABLE 4

| Bag material | atmosphere | Amount of PFOA + PFOS | Total amount of PFAS |
|---|---|---|---|
| Ex. 4 | PET/Al/PE | N2 + O2 | 11 ppb | 166 ppb |

Example 3 and Example 4 above show that, in the presence of protected atmosphere and of the gas barrier, the present method is effective at reducing the generation of undesired fluorinated products (PFOA+PFOS and PFAS).

The fact that the low molecular weight PTFE shows a PFAS content twice as much as the powder not pulverised or ground can be explained by the fact that PFOA is formed both on the surface and inside the PTFE particles. The pulverisation or grinding therefore makes the PFOA formed internally, and therefore not analysed, accessible in the PTFE of Example 3. In order to analyse the PFOA inside PTFE, it is necessary to pulverise it in order to make the solvent extraction method provided for by the analytical method effective. As a matter of fact, PTFE is insoluble in solvents.

Example 5

A sample of 612 g of high molecular weight PTFE was packaged in a bag with two various layers, polypropylene 20 μm and metallised biaxially oriented polypropylene 20 μm (OPP/mOPP), under inert nitrogen atmosphere, as previously indicated. This sample was analysed after an irradiation process at 100 kGy. The Date are reported in table 5 below:

TABLE 5

| Bag material | atmosphere | Amount of PFOA + PFOS | Total amount of PFAS |
|---|---|---|---|
| Ex. 5 | OPP/mOPP | N2 + % O2 | 16 ppb | 163 ppb |

The result of Example 5 is slightly worse than Example 3, given that the chamber wall of the bag has a gas barrier (metallised biaxially oriented polypropylene) which is less efficient than that of Example 3. Nevertheless, the amounts of undesired substances formed are acceptable.

Example 6

A sample of 350 g of high molecular weight PTFE was packaged in a bag with three different layers, PET 12 μm, aluminium 6.35 μm, polyethylene 90 μm (PET/Al/PE), under an inert nitrogen atmosphere, as indicated previously. The high molecular weight PTFE is in powder form and was pre-treated by heating at 330° C. for 6 hours, and subsequently at 200° C. for 5 hours with cooling under nitrogen atmosphere, in order to thermally decompose the carboxyl end groups of the PTFE chains (first heating step at 330° C.) and removing the moisture present (second heating step at 200° C.) under nitrogen atmosphere.

This sample was analysed after an irradiation process at 100 kGy. The Date are reported in table 6 below:

TABLE 6

| Bag material | atmosphere | Amount of PFOA + PFOS | Total amount of PFAS |
|---|---|---|---|
| Ex. 6 | PET/Al/PE | N2 + O2 | 7 ppb | 96 ppb |

The result of Example 6 is in line with Examples 3 and 5, given that the amounts of undesired substances formed are acceptable.

Example 7

We proceed as in Example 6, using a two-layer bag, polypropylene 20 μm, metallised biaxially oriented polypropylene 20 μm (OPP/mOPP), under inert nitrogen atmosphere, and subjecting such bag to the two heating cycles (330° C. for 6 hours, 200° C. for 5 hours).

This sample was analysed after an irradiation process at 100 kGy. The Date are reported in table 7 below:

TABLE 7

| Bag material | atmosphere | Amount of PFOA + PFOS | Total amount of PFAS |
|---|---|---|---|
| Ex. 7 | OPP/mOPP | N2 + O2 | 14 ppb | 130 ppb |

Example 6 and Example 7 above shows that the heating cycles carried out previously on the high molecular weight PTFE have no effects on the formation of undesired substances.

Example 8

Inside a bag with a layer of aluminium or metallised polymer or with lacquering, under an inert nitrogen atmosphere, the estimated oxygen concentration inside the bag is about 300 ppm.

Table 8 below reports the results of two irradiation tests conducted in air and in controlled atmosphere.

TABLE 8

| Properties | Units | Sample 2 (in air) | Sample 3 (in nitrogen) |
|---|---|---|---|
| Melt flow rate (372° C./21.6 Kg) | g/10' | 2.3 | 0.2 |
| Viscosity | Pa * s | 7.0 * 10$^4$ | 6.3 * 10$^5$ |
| Particle size | | | |
| D10 | μm | 1.6 | 15.9 |
| D50 | μm | 6.9 | 61.6 |
| D90 | μm | 45.8 | 164.9 |
| D99 | μm | 128.3 | 253.9 |
| Melting temperature | ° C. | 331.9 | 334.3 |
| First melting heat | J/g | 77.1 | 78.3 |
| Crystallisation temperature | ° C. | 317.1 | 317.2 |
| Crystallisation heat | J/g | 71.9 | 64.8 |
| Thermal stability | Loss % | 1.5 | 0.8 |

According to these preliminary results, the irradiation process on Sample 3 (under controlled atmosphere) is less effective than the air-treated sample. The average molecular weight (MW) values among the low molecular weight PTFEs of the two samples indicate that Sample 2 of PTFE irradiated in air was reduced by 31.5 times, while the MW of PTFE irradiated under nitrogen (Sample 3) was reduced by 18.6 times. Thus, obtaining the same result of decrease in the molecular weight under inert atmosphere entails the need for further irradiation steps and/or higher irradiation.

Further irradiation tests at 400 kGy and 800 kGy are currently under way.

Example 9: Study of PTFE Irradiation as a Function of Oxygen Concentration

Five oxygen concentrations—140 ppm, 180 ppm, 340 ppm, 16000 ppm and 21000 ppm—were investigated in the present example.

Dansensor CheckMate 3 instrument, configuration O$_2$ (Zirconium) with the parameters reported in Table 9 below was used to determine the residual oxygen.

TABLE 9

| Available configurations | O$_2$ (Zirconium) |
|---|---|
| Equipment | Our oxygen sensor is faster and more accurate |
| Sampling volume | 3 ml |
| Sampling time | 5 seconds |
| Measuring range | 0-100% |
| Resolution | 0.001% |
| Sensor accuracy* | ±0.01% |
| Heating time | 10 minutes |
| Dimensions & weight | 180 × 315 × 220 mm (H × L × L), 3.7 kg |
| Power supply | 100-240 VAC, 50-60 Hz |
| Options | Integrated printer, CheckMate-Software for PC, SmartPen—retractable needle, Can Piercer for analysing cans and wine bottles, scanner for barcode, standard consumable kit (code 300436) |
| Connections | USB, Ethernet (RJ45), RS232 (D89) |
| Memory | Minimum 1,000 programs, 10,000 measurements depend on the set-up |
| Compatibility with other software | Mettler-Toledo FreeWeigh.net, Sartorius ProControl (WinSPC), OCS ComScale NT, Microsoft SQL database, Bizerba_statistics.BRAIN |

In a first step, irradiation was performed with gamma rays at room temperature.

Table 10 below reports the results of the tests conducted on PTFE of Type P0W34 (regenerated PTFE, from suspension):

TABLE 10

| Material reference | Type of bag | Concentration O2 | PFOA (ppb) | PFAS sum (ppb) |
|---|---|---|---|---|
| POW34 (300 kGy) | PET 12my-A 6.35my-PET 12my-PP | 140 ppm | 42.6 | 418 |
| POW34 (300 kGy) | PET 12my-A 6.35my-PET 12my-PP | 180 ppm | 38.2 | 450 |
| POW34 (300 kGy) | PET 12my-A 6.35my-PE 100my | 340 ppm | 33.1 | 330 |

Table 10 above shows that, considering the same irradiated dose at low oxygen concentrations—140 ppm-180 ppm—the detected amount of PFOA is not lower than that detected at the concentration of 340 ppm. Furthermore, an oxygen concentration comprised from 300 ppm to 380 ppm of oxygen is much easier to obtain industrially with respect to lower concentrations for which more vacuum-nitrogen cycles are required. For oxygen concentrations below 200 ppm—as shown in the table—a 4-layer bag with good oxygen barrier and at the same time more resistant to temperature with respect to the 3-layer bag was adopted.

By irradiating a second type of PTFE, referred to as FT02A/IRR800PVA5 (PTFE from virgin suspension+ PFOA-free additive (100% virgin PTFE from suspension with D50 equal to 20.0 μm), at higher oxygen concentrations, it is noted that the PFOA value increases (Table 11).

Melting points and melt flow rate (MFR), measured according to the ASTM D 1238 standard, with a nozzle diameter of 1.048 mm, at a temperature of 372° C., with an applied load of 2.16 kg of the 2 samples irradiated at 800 kGy are similar thus demonstrating that though the residual oxygen concentration increased, at 16000 ppm there was no decrease in the molecular weight with respect to a lower oxygen concentration, 340 ppm.

TABLE 11

| Material reference | Type of bag | Concentration O2 | PFOA (ppb) | PFAS sum (ppb) | Melting Point (° C.) | MFR (g/10) |
|---|---|---|---|---|---|---|
| FT02A/ IRR800PVA5 (800 kGy) | PET 12my-A 6.35my-PE 100my | 340 ppm | 255 | 2994 | 324.2 | 2.70 |
| FT02A/ IRR800PVA5 (800 kGy) | PET 12my-A 6.35my-PE 100my | 16000 ppm | 290 | 3324 | 324.4 | 2.80 |

A further confirmation of the residual oxygen value in the range comprised from 300 ppm to 380 ppm can be deduced from the irradiation of a third type of PTFE, referred to as FT02A (PTFE from virgin suspension).

As observable from the irradiation of FT02A (Table 12 below), it is confirmed that 340 ppm of residual oxygen is a good concentration to be adopted also for this type of PTFE. The increase in PFOA is limited as the irradiation increases. At 800 kGy the PFOA value under these conditions is 44.3 ppb, while a significant decrease in PFOA is not observed at 300 kGy with an oxygen content of 140 ppm.

The PFOA value in the PTFE irradiated in the 3-layer bag in air equal to 223 ppb is reported for comparison.

TABLE 12

| Material reference | Type of bag | Concentration O2 | PFOA (ppb) | PFAS sum (ppb) |
|---|---|---|---|---|
| FT02A (200 kGy) | PET 12my-A 6.35my-PE 100my | 340 ppm | 16.1 | 206 |
| FT02A (300 kGy) | PET 12my-A 6.35my-PET 12my-PP | 140 ppm | 28.8 | 269 |
| FT02A (800 kGy) | PET 12my-A 6.35my-PE 100my | 340 ppm | 44.3 | 464 |
| FT02A (800 kGy) | PET 12my-A 6.35my-PE 100my | 210000 ppm | 223 | 1936 |

Example 10: Irradiation Study as a Function of the Irradiation Rate

Several tests were conducted at different irradiation speeds or at different irradiation rates considering the same irradiated dose, considering time as variable. From the tests carried out, irradiation rates higher than 250 kGy/h show a disordered breakage of PTFE with a consistent formation of PFOA. By adopting irradiation rates equal to or less than 100 kGy/h, the breakage of the polymer is more regular with low PFOA content. This effect is evident both in air and under controlled atmosphere. Table 13 below reports some examples.

TABLE 13

| Material reference | KGy/h rate | Type of bag | Concentration O2 | PFOA (ppb) | PFAS sum (ppb) |
|---|---|---|---|---|---|
| FT02A (800 kGy) | 250 KGy/h | PET 12my-A 6.35my-PE 100my | 340 ppm | 1016 | 10928 |
| FT02A (800 kGy) | 250 KGy/h | PET 12my-A 6.35my-PE 100my | 21000 ppm | 2547 | 23596 |
| FT02A (800 kGy) | 10 KGy/h | PET 12my-A 6.35my-PE 100my | 340 ppm | 44.3 | 464 |
| FT02A (800 kGy) | 200 KGy/h | PET 12my-A 6.35my-PE 100my | 210000 ppm | 144 | 840 |
| POW34 (800 kGy) | 10 KGy/h | PET 12my-A 6.35my-PE 100my | 340 ppm | 60.1 | 635 |
| POW34 (800 kGy) | 10 KGy/h | PET 12my-A 6.35my-PE 100my | 210000 ppm | 256 | 2632 |

The irradiation rate to be adopted is as a function of different variables: it depends on the type of PTFE to be irradiated, on the irradiation dose, on the oxygen concentration, on the PFOA specification to be attained and on the productivity required to make the process competitive.

Furthermore, PFOA formation depends on secondary variables such as source energy. However, this variable is less influential than the irradiation rate.

Therefore, formation of PFOA is facilitated with high irradiation doses. The expression high irradiation doses is used to indicate source energies higher than 7 MeV, preferably in the range comprised from 13 MeV to 30 MeV or comprised from 14 MeV to 20 MeV, and irradiation rates higher than 100 kGy/h.

Excellent results were obtained by working with source energies lower than 7 MeV (in particular 3 MeV) and, where higher energies are used, satisfactory results were obtained by working in pulses.

Example 11: Irradiation Study as a Function of the Type of PTFE

Following some differences found during irradiation under inert atmosphere in terms of PFOA for types of PTFE of different origin, PTFE samples mixed with varying percentages—comprised from 10% to 20% by weight—of PTFE irradiated at 800 kGy or 1000 kGy with a PFOA content<25 ppb, were irradiated. The irradiation tests conducted show an increase in the PFOA content with respect to the corresponding non-additivated base. Table 14 below reports some examples.

TABLE 14

| Material reference | Type of bag | Concentration O2 | PFOA (ppb) | PFAS sum (ppb) |
|---|---|---|---|---|
| FT02A (800 kGy) | PET 12my-A 6.35my-PE 100my | 340 ppm | 44.3 | 464 |
| FT02A/20% IRR800PVA5 (800 kGy) | PET 12my-A 6.35my-PE 100my | 340 ppm | 255 | 2994 |
| POW34 (800 kGy) | PET 12my-A 6.35my-PE 100my | 340 ppm | 60.1 | 635 |
| POW34/20% IRR1000POW34 (800 kGy) | PET 12my-A 6.35my-PE 100my | 340 ppm | 152 | 1806 |

The conducted tests show that, as a function of the material to be irradiated, there arises the need to adopt well defined irradiation conditions for each type of PTFE so as to produce a PTFE with PFOA content<25 ppb. It is likely that the formation of radicals at the surface of the PTFE particles is facilitated in the case of an addittivated PTFE.

The surface radicals are probably primary, given that the surface is expected to have interrupted PTFE chains. Furthermore, on the surface there will be a higher density of oxygen dissolved in the granule or of oxygen (residual) of the inert atmosphere, given that oxygen spreads slowly deep-wise.

The PFOA formation has been facilitated by the contact with the "activated" granules, i.e., which already have radicals on the surface. The contact between the surface of the activated granules of the pre-irradiated PTFE and the surface of the non-irradiated PTFE facilitates the formation of radicals on the surface of the non-irradiated PTFE, through fluorine transfer mechanisms or other groups from the non-irradiated PTFE to the irradiated PTFE.

Example 12: Irradiation Study as a Function of the Temperature

It is known that high temperature radiation increases the crosslinking of PTFE (T. Matsugashita and K. Shinohara, J. Chem. Phys. 35, 1652 (1961)).

While on the one hand the temperature must not be too high to avoid crosslinking and damaging the chamber or bag, on the other hand it cannot be too low so as not to prevent a given mobility of the radicals.

In order to better define such temperature, electron paramagnetic resonance (EPR) activity applied to the study of the radio-induced radicals in PTFE was carried out.

Thermal tests carried out on the adopted 3-layer bag (PET/Al/PE; like in Example 3), showed a deterioration of the bag at 150° C. for 24 hours.

Other tests at temperatures comprised from 105° C. to 118° C., preferably from 110° C. to 117° C., carried out for 48 hours instead showed a good resistance of the bag. Therefore, it is concluded that a temperature comprised from 105° C. to 118° C. for the 3-layer bag is the maximum operating temperature.

In the tests below, a temperature of 115° C. will be indicated—by way of example—for all the tests carried out at temperatures comprised from 105° C. to 118° C., for the sake of brevity and given that all the other tests not discussed in detail also revealed results in line with the tests at 115° C.

The LC-MSMS analyses carried out on irradiated PTFE show that the structure of the PFOA that is formed is linear. Therefore, it is plausible to assume that the primary radical is responsible for the formation of PFOA once the radical comes into contact with oxygen and moisture.

In the present example 5 aliquots (about 100 mg each) were prepared starting from a batch of PTFE gamma-irradiated at 200 kGy in a nitrogen atmosphere with residual oxygen 180 ppm. The aliquots were inserted into 5 quartz tubes (internal diameter 3 mm, external diameter 4 mm) by means of drybox operations under nitrogen. The tubes were flame-sealed.

Table 15 below shows the treatment conditions of some samples:

TABLE 15

| Sample | R (rif) | A | B | C | D |
|---|---|---|---|---|---|
| Temperature | — | 40° C. | 80° C. | 115° C. | 150° C. |
| Duration | — | 48 h | 48 h | 48 h | 24 h |

The CW-EPR spectra of the five samples of PTFE were acquired at room temperature prior to the thermal treatment. The spectra were normalised.

As observable from FIG. 1, the spectra are identical, and this indicates the fact that the transfer of the material into each quartz tube and the subsequent closure was carried out uniformly for the various samples: as a matter of fact, had one of the samples absorbed oxygen from the air, its signal would have changed by widening the lines.

The CW-EPR spectrum recorded on the irradiated PTFE samples is attributed by Siegel et al. (Siegel, S.; Hedgpeth, H. «*Chemistry of Irradiation Induced Polytetrafluoroethylene Radicals: I. Reexamination of the EPR Spectra*» (1967) The Journal of Chemical Physics, 46(10), 3904) to the secondary peroxide radical (2), which is formed starting from the secondary fluoroalkyl radical (1) according to the following scheme:

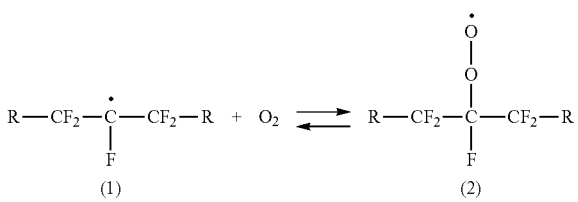

Therefore, this indicates that residual oxygen combined with secondary fluoroalkyl radicals.

Figure 2:
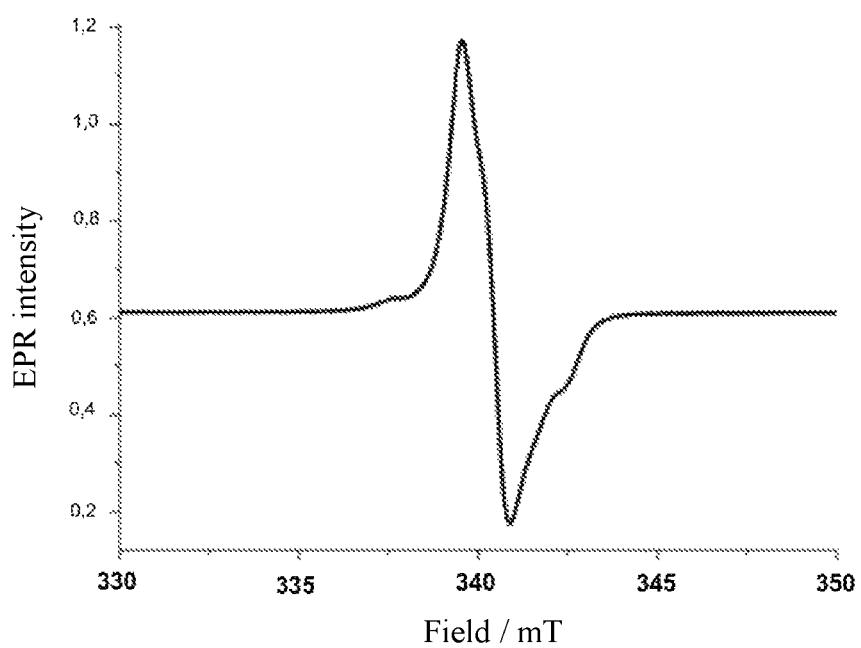
FIG. 2 shows a CW-EPR spectrum showing the result of superimposition of the signal due to a chain peroxide radical and a terminal peroxide radical.

According to Oshima et al. (Oshima, A., Ikeda, S., Seguchi, T., Tabata, Y. "*Improvement of radiation resistance for polytetrafluoroethylene (PTFE) by radiation crosslinking*" (1997) Radiation Physics and Chemistry 49, 279-284), the spectrum in FIG. 2 is the result of the superimposition of the signal due to the chain peroxide radical (2) and the terminal peroxide radical (3):

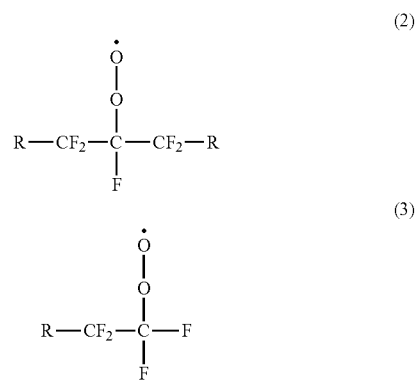

This latter hypothesis appears to be the most likely, given that the signal obtained in these tests is not exactly identical to that of Siegel et al., which explains whether the signal derives from a combination with different weights of (2) and (3).

Figure 3:
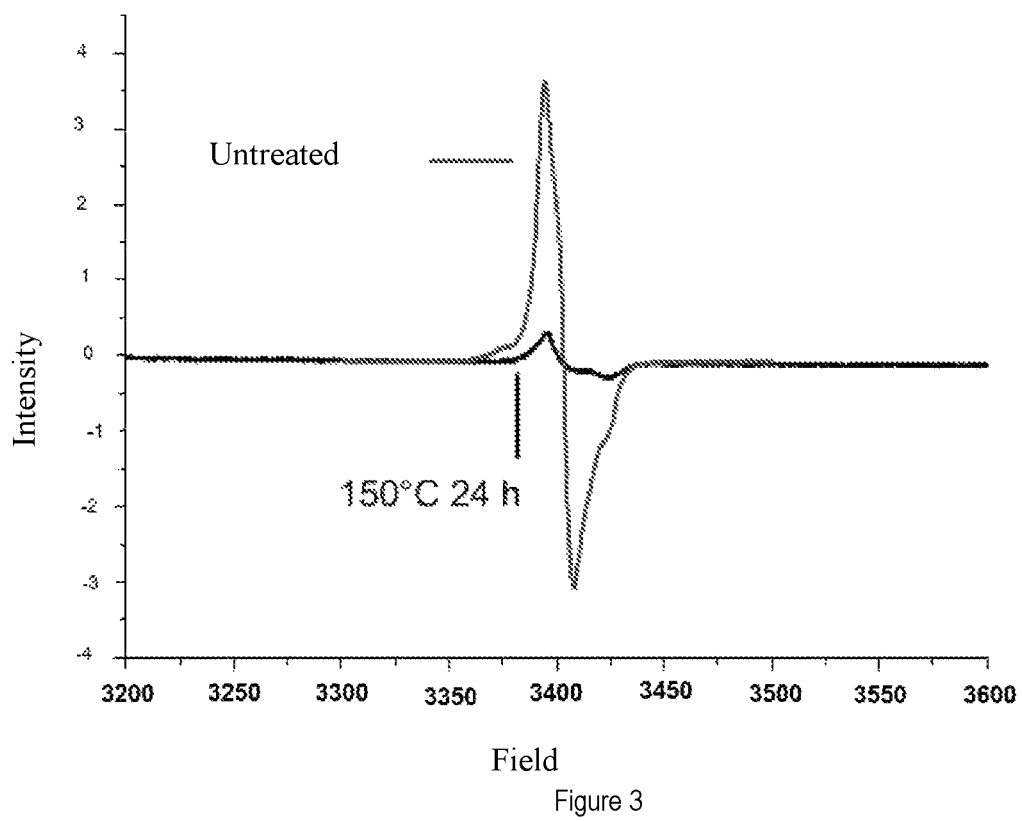
FIG. 3: shows a CW-EPR spectrum of an untreated sample and of a sample subjected to heating at 150° C. for 24 h.

If the sample is subjected to heating at 150° C. for 24 h, the spectrum changes visibly (FIG. 3). Overall, the signal is reduced to one tenth of the original signal, indicating that the heating caused the significant disappearance of the original radicals.

Figure 4:
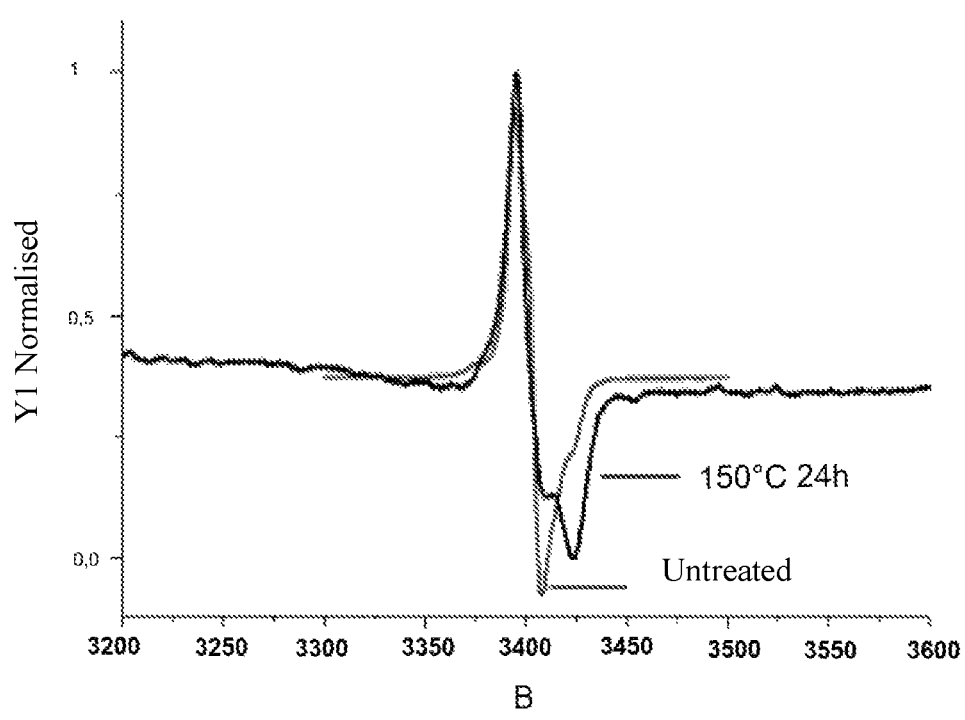
FIG. 4 shows a comparison between normalised CW-EPR spectra of a sample before treatment (untreated) and after thermal treatment at 150° C. for 24h.

The comparison between the normalised spectra (FIG. 4) makes it clear that the EPR spectrum of the sample before treatment is different from the EPR spectrum after thermal treatment at 150° C. for 24h. In particular, it is clear that the residual signal after the treatment has peaks corresponding to peaks and shoulders already present in the other signal. Thus, the EPR spectrum after thermal treatment shows a signal that can be attributed to radicals surviving the thermal treatment. As a matter of fact, these are probably secondary peroxide radicals (2) which resist more than the primary peroxide radicals (3).

Figure 5:
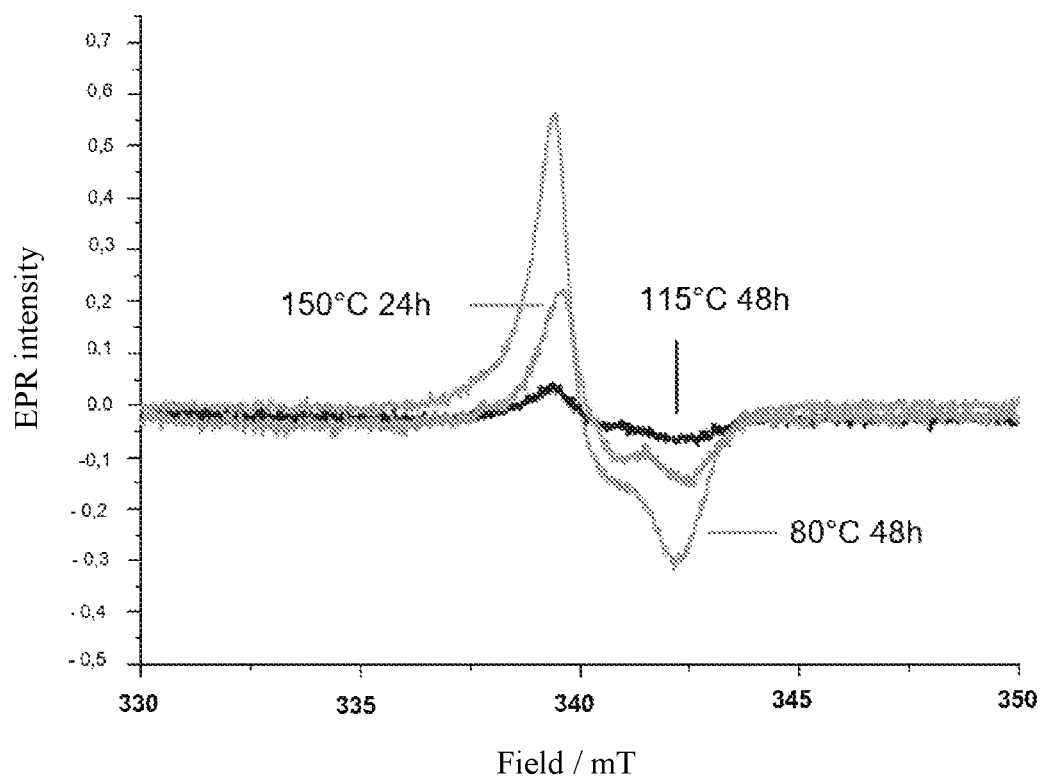
FIG. 5 shows a comparison between CW-EPR spectra of a sample after thermal treatment carried out at 80° C. and 115° C. for 48 h and of sample treated at 150° C. for 24 h.

After thermal treatment carried out at 80° C. and 115° C. for 48 h, EPR spectra can be compared with the EPR spectrum of the sample treated at 150° C. for 24 h (FIG. 5). The EPR spectra, acquired under the same conditions, show that the treatment at 115° C. for 48 h results in an overall decrease in the radical signal higher than that at 150° C. for half the time.

Figure 6:
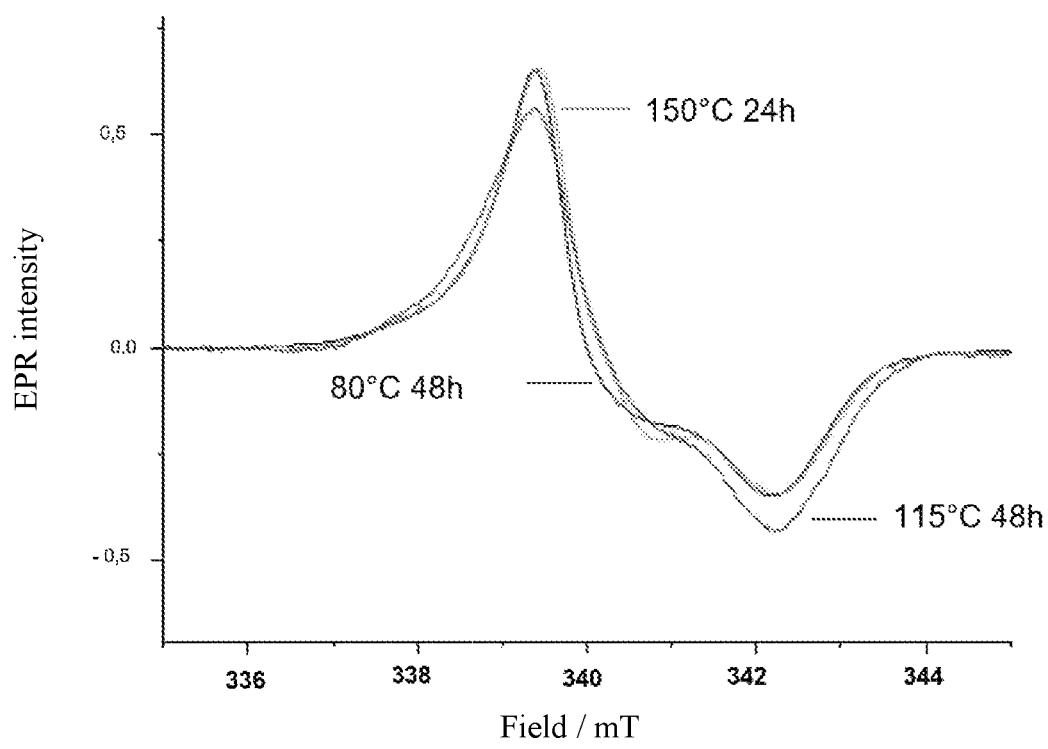
FIG. 6 shows a comparison between the spectra of FIG. 5 after normalization.

The comparison between the same normalised spectra (FIG. 6) allows to better highlight possible differences. The spectral profile is very similar in all three cases. This indicates that we are observing substantially the same type of radicals. The profile is practically identical (apart from the line width) to that attributed to secondary peroxide radicals (2) by Oshima et al.

Figure 7:
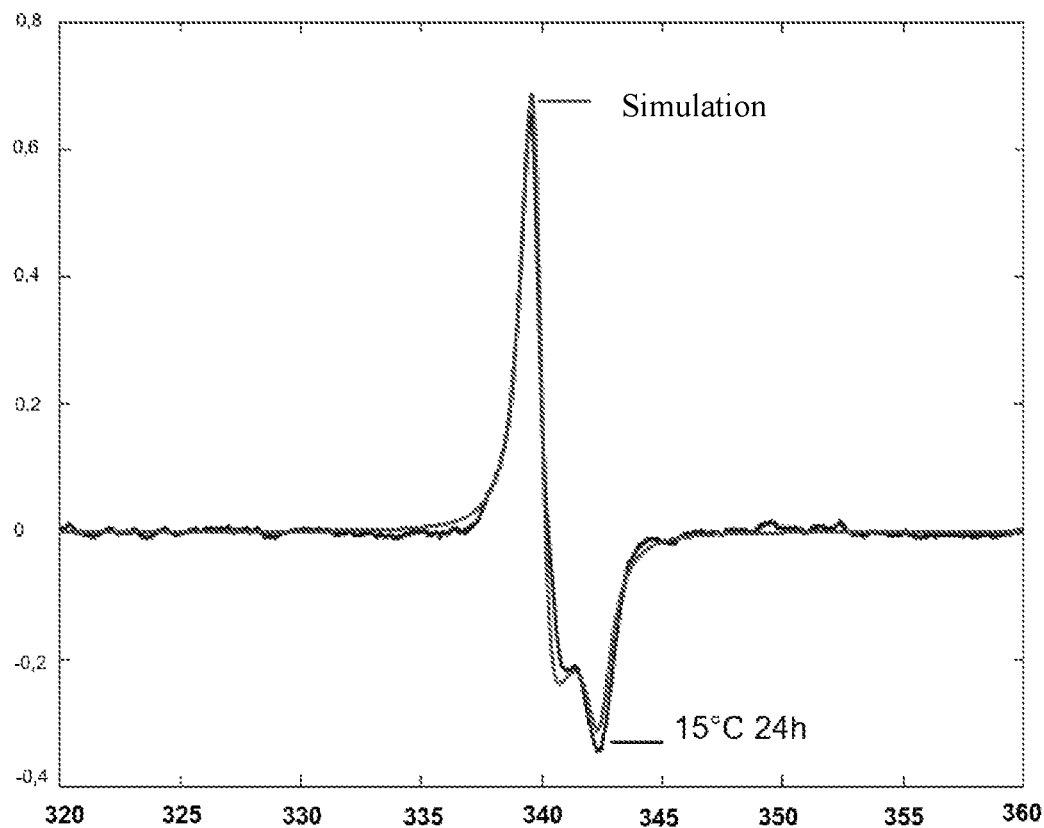
FIG. 7 shows a CW-EPR spectrum of a sample treated at 150° C. for 24h and of a simulation of the same spectrum conducted by means of a mathematical calculation of the EPR profile.

In order to identify the characteristic physical parameters of the spectrum, a simulation was conducted by means of a mathematical calculation of the EPR profile. FIG. 7 shows the EPR spectrum of the sample treated at 150° C. for 24 h and the simulation thereof. The simulation was very good, thus very reliable.

Figure 8:
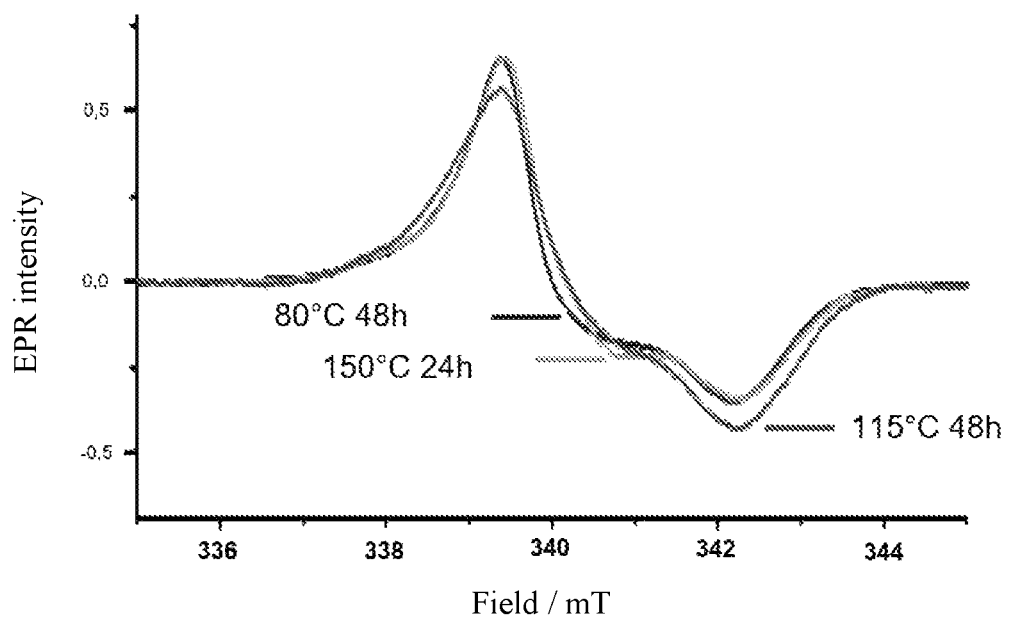
FIG. 8 shows an observation of line widths for CW-EPR spectra between 80° C. and 150° C.

From the simulation a several considerations can be made:
- the calculated spectrum is the so-called «powder spectrum», a spectrum with many isolated crystals, i.e. it takes a random orientation distribution of fixed radicals. The fact that, both in terms of intensity and position, the lines are very close to the calculated ones, indicates that the secondary radicals are in mobile sites, therefore in the PTFE crystalline areas;
- The similarity of all the thermally treated spectra between 80° C. and 150° C., and thus the similarity thereof with powder spectra, suggests that all these spectra substantially represent powder spectra;
- Small differences can be observed in line widths for spectra between 80° C. and 150° C. For example, FIG. 8, the spectrum at 115° C. for 48 h shows wider lines, with respect to 80/48 or 150/24, but the positions of the lines do not change: this indicates that the thermal treatment tends to reduce the secondary radicals but in environments with slightly different mobility, with greater reduction for the radicals with greater mobility. However, these radicals are always in crystalline areas.

Figure 9:
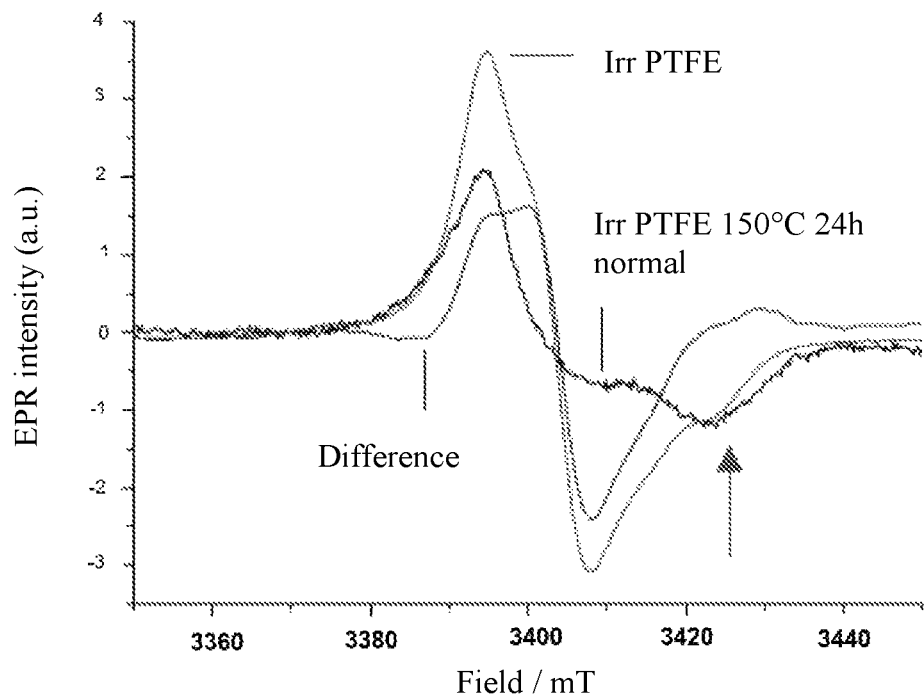
FIG. 9 shows a untreated irradiated PTFE spectrum and PTFE spectrum irradiated at 150° C. for 24 hours. The spectrum relating to the PTFE irradiated at 150° C. for 24 hours was normalised; the arrow indicates a shoulder having the same intensity as the EPR spectrum of the untreated control.

The difference between the untreated irradiated PTFE spectrum and the PTFE spectrum irradiated at 150° C. for 24 hours was performed in order to define the EPR spectrum of the secondary radicals (FIG. 9).

Figure 10:
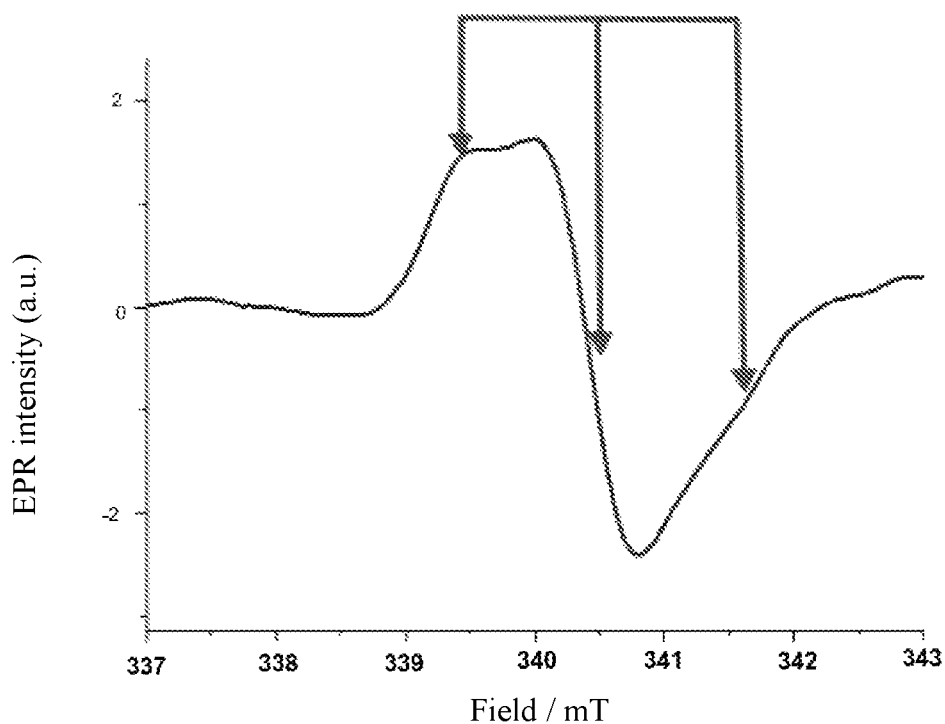
FIG. 10 shows a difference spectrum modelled like a CW-EPR spectrum of a 1:2:1 triplet in slow motion.

The spectrum relating to the PTFE irradiated at 150° C. for 24 hours was normalised so that the shoulder (indicated by the arrow) has the same intensity as the EPR spectrum of the untreated (FIG. 9): the shoulder is a characteristic attributable to the secondary radicals, and thus the signals of the secondary radicals are subtracted from the overall signal (primary radicals+secondary radicals). The difference spectrum can be modelled like the EPR spectrum of a 1:2:1 triplet in slow motion. The distance between the lines of the triplet is about 1.4 mT (FIG. 10). The spectrum is perfectly matches the one attributed to primary radicals of the RCF20 type.

Conclusions of the EPR Study:

The analyses confirm that the EPR spectrum in the PTFE irradiated under inert atmosphere is the superimposition of signals from primary and secondary peroxide radicals.

Secondary peroxide radicals appear to be located in crystalline areas, as observable from the characteristic powder spectrum thereof.

The study carried out shows that the rapid disappearance of the primary radicals also occurs with prolonged heating at low temperature, also with 80° C., as can be deduced from the perfect similarity of the EPR signals from treatment at high temperature (150° C.) and low temperature (80° C.). Based on the reasonable assumption that PFOA is derived from primary radicals, the EPR analysis suggests that prolonged thermal treatments (as observed, even just at 80° C.), have the same effect as treatments at a higher temperature in eliminating or decreasing the formation of PFOA but the decrease occurs more selectively without drastically decreasing the secondary radicals not responsible, like the primary radicals, for the formation of PFOA. In particular, it is observed that treatments at temperatures ranging from 105° C. to 118° C., preferably comprised from 110° C. to 117° C., for 48h are however more effective in reducing radicals than treatments at 150° C. for 24h.

It is therefore inferred that in order to reduce radicals in a less extreme way, it is advisable to treat for longer at lower temperatures.

Working more selectively as concerns primary radicals with respect to secondary radicals is particularly important for producing, applying the present method, a PTFE with similar performance with respect to the PTFE produced by means of irradiation in air.

Upon completion of the studies described above, working at rates<100 kGy/h, under inert atmosphere with oxygen concentrations at 300 ppm and temperatures higher than 20° C. and lower than 115° C. to be defined for each type of material to be irradiated, the irradiated PTFE showed a PFOA content<LOQ with LOQ 1 ppb. Some tests for high irradiations are reported in Table 16 below.

TABLE 16

| Material reference | Type of bag | PFOA (ppb) | PFAS sum (ppb) |
|---|---|---|---|
| FT02A (800 kGy) | PET 12my-A 6.35my-PE 100my | <LOQ | 14 |
| FT02A (1000 kGy) | PET 12my-A6.35my-PE 100my | <LOQ | 21 |

The melt flow rate (MFR) analysis of the irradiated materials reveals that in order to have an equivalent PTFE irradiated in air, a greater irradiation quantifiable from 20 to 40% is required depending on the degree of irradiation.

Further EPR tests of radicals in irradiated PTFE were conducted on samples heated at 70° C. for 48 hours, after heating at 40° C. for 48 hours.

Figure 11:
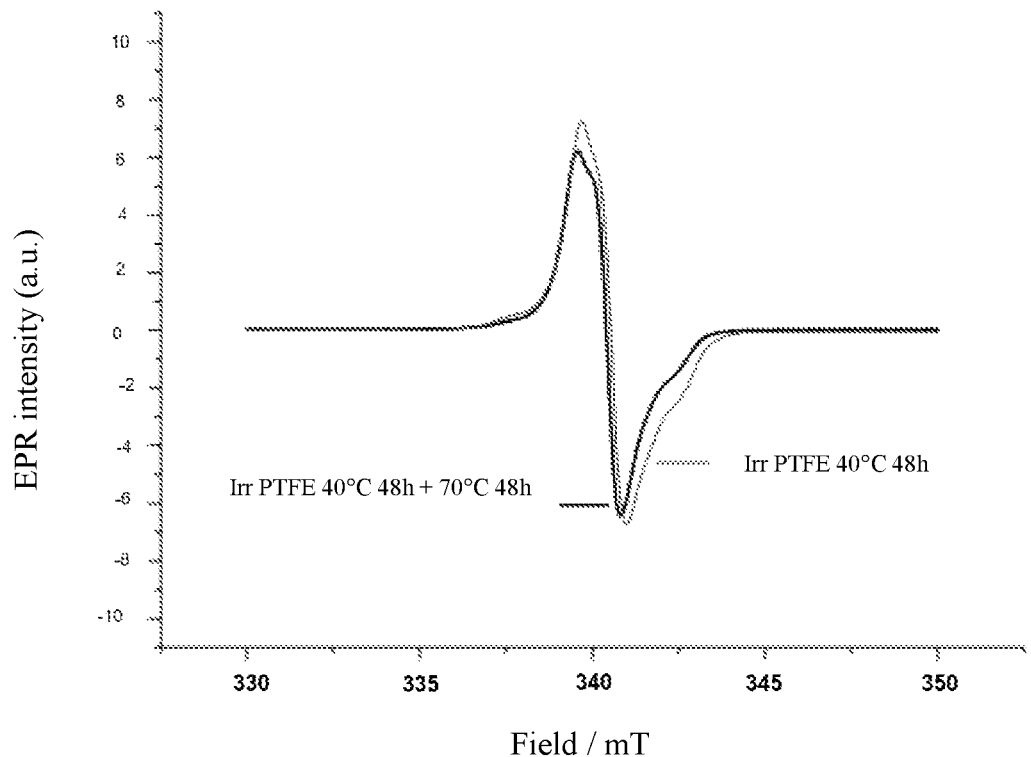
FIG. 11 shows further EPR tests of radicals in irradiated PTFE conducted on samples heated at 70° C. for 48 hours, after heating at 40° C. for 48 hours.

Surprisingly, the signal appears to be decreased in intensity, but not markedly when compared with the sample subjected to heating at 80° C. for 48 hours. A closer analysis clearly shows that the line width has increased, especially for secondary radicals, and this is the reason for the apparent decrease in intensity. If we suppose that such radicals are distributed in crystalline-type sites, heating at 70° C. does not appear to have caused a significant decay but just redistribution to several different sites, resulting in an increase in inhomogeneous line broadening (FIG. 11).

Given that the EPR technique is not a quantitative technique, but just semiquantitative, we can obtain an estimate of the number of radicals (indicated as spin/g) using a standard reference at known concentration of paramagnetic species. A sample of Mn(II) in CaO was used, which allows to obtain a good stable signal.

Before: refers to the sample before the thermal treatment; After: after the specific thermal treatment.

The treatments are the same as in Table 15, where Ref.=untreated reference sample.

The results are reported in Table 17 expressed as the number of total radicals in the sample.

TABLE 17

|  | A | B | C | D | Ref |
|---|---|---|---|---|---|
| Before | 2.3E+15 | 9.3E+14 | 1.5E+15 | 7.8E+14 | 1.0E+15 |
| After | 1.9E+15 | 2.1E+14 | 2.4E+13 | 4.8E+13 |  |

Figure 12:
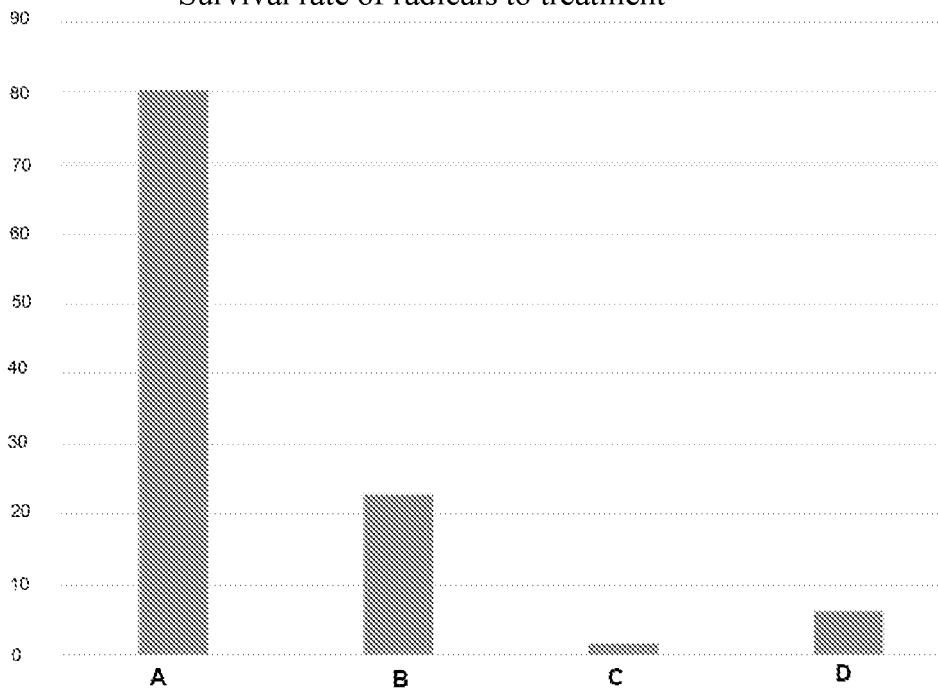
FIG. 12 shows the extent of the decay/survival rate of radicals induced by the various thermal treatments.

From the quantifications, we can obtain the extent of the decay induced by the various thermal treatments. It is clear that sample C (115° C.) surprisingly shows more significant overall decay, with a lower survival rate of the radicals in the treatment with respect to the samples treated both at lower temperature (sample B, at 80° C.) and at higher temperature (sample D; at 150° C.). These results are shown schematically in FIG. 12.

Advantageously, the method of the present invention allows to obtain low molecular weight PTFE without the need to add further reagents or chain terminators, such as for example halogenated polymers.

Advantageously, the method of the present invention allows to obtain low molecular weight PTFE without the need to carry out purifications of the low molecular weight PTFE after the irradiation step.

Advantageously, the method of the present invention allows to obtain low molecular weight PTFE without the need to conduct post-treatment thermal treatments at higher temperatures with respect to the maximum irradiation temperature, given that a control of the temperature during the irradiation step allows to do without additional thermal treatment steps.

Following the process according to the present invention allows to obtain the dual advantage of exploiting the thermal increase due to the irradiation process itself as well as facilitating degradation, which is more selective toward the primary radical, avoiding subsequent reaction of the primary radical with the residual $O_2$ remaining dissolved inside the chamber or bag.

Advantageously, the method of the present invention was elaborated despite and against an experimental evidence that is disadvantageous (lower decrease in MW) to the fragmentation of the high molecular weight PTFE, in the presence of a lower amount of oxygen with respect to the atmospheric value.

Advantageously, the low molecular weight PTFE obtained by means of the present method has compatibility characteristics, and much more, not different from the low molecular weight PTFE obtainable with the known techniques.

Advantageously, the use of chambers or chamber walls or bags comprising polyethylene allows to hermetically close the chamber better, and provide a material that is more neutral to irradiation. Advantageously, a pulse, intermittent or alternate step operating technique allows to improve the productivity of the present method.

Preferred embodiments (Ens) of the present invention are illustrated below:

E1. A method for obtaining low molecular weight polytetrafluoroethylene (PTFE) comprising the following steps:
provision of high molecular weight PTFE;
arrangement of said high molecular weight PTFE in a chamber, delimited by a gas barrier and containing a controlled atmosphere with an amount of oxygen comprised from 0.2% to 17% by volume;
hermetical closure of said chamber containing said high molecular weight PTFE;
irradiation of said PTFE in said hermetically closed chamber to obtain said low molecular weight PTFE.

E2. The method for obtaining low molecular weight PTFE according to E1, wherein besides said amount of oxygen, said controlled atmosphere contains an inert gas, preferably nitrogen, and wherein said controlled atmosphere is free of halogenated polymers.

E3. The method for obtaining low molecular weight PTFE according to any one of E1-E2, wherein said high molecular weight PTFE is placed in said chamber together with a gas composition corresponding to said controlled atmosphere.

E4. The method for obtaining low molecular weight PTFE according to any one of E1-E2, wherein said controlled atmosphere is created in said chamber prior to or subsequently to said step of arrangement of said high molecular weight PTFE in said chamber, before said step of irradiating said PTFE in said chamber.

E5. The method for obtaining low molecular weight PTFE according to any one of E1-E4, wherein said gas barrier has an oxygen permeability≤0.5 cc/m2/24h (ASTM D3985-95, 23° C.-0% RH), preferably ≤0.3 cc/m2/24h, even more preferably ≤0.1 cc/m2/24h, and a water 2 cc/m2/24h (ASTM F1249-90, 38° C.-90% RH), preferably ≤1 cc/m2/24h, even more preferably ≤0.1 cc/m2/24h.

E6. The method for obtaining low molecular weight PTFE according to any one of E1-E5, wherein said gas barrier comprises at least one metal layer and/or a metallised polymeric layer, said gas barrier being connected to, or integrated in, a flexible bag defining said chamber.

E7. The method for obtaining low molecular weight PTFE according to any one of E1-E6, wherein said step of irradiating the PTFE in said chamber is carried out through said gas barrier to reduce an incident irradiation on said high molecular weight PTFE.

E8. The method for obtaining low molecular weight PTFE according to any one of E1-E7, wherein said amount of oxygen is comprised from 0.25% to 15% by volume, preferably comprised from 0.5% to 10% by volume.

E9. The method for obtaining low molecular weight PTFE according to any one of E1-E8, wherein said high molecular weight PTFE is in the form of a powder or (micro-)particles with an average particle size distribution comprised from 20 μm to 700 μm, more preferably comprised from 50 μm to 500 μm, even more preferably comprised from 100 μm to 300 μm, said high molecular weight PTFE being irradiated in a controlled atmosphere containing, besides said amount of oxygen, an inert gas (for example nitrogen or helium), and free of halogenated polymers, at a temperature comprised from −20° C. to 300° C. and with a high molecular weight PTFE exposure dose comprised from 5 kGy to 1600 kGy and wherein said low molecular weight PTFE obtained at the end of the irradiation step is in the form of particles with an average particle size distribution comprised from 0.1 μm to 300 μm, more preferably comprised from 0.2 µm to 100 µm, even more preferably comprised from 0.3 µm to 50 µm.

E10. Low molecular weight PTFE obtained by means of the method according to any one of E1-E9.

Further embodiments (Fns) of the present invention are illustrated below:

F1. A method for obtaining low molecular weight polytetrafluoroethylene (PTFE) comprising the following steps:
provision of high molecular weight PTFE;
arrangement of said high molecular weight PTFE in a chamber, delimited by a gas barrier and containing a controlled atmosphere with an amount of oxygen comprised from 0.005% to 0.5% by volume, wherein said gas barrier has an oxygen permeability≤0.5 cc/m2/24h (ASTM D3985-95, 23° C.—0% RH) and a water vapour permeability≤2 cc/m2/24h (ASTM F1249-90, 38° C.—90% RH);
hermetical closure of said chamber containing said high molecular weight PTFE;
irradiation of said PTFE in said hermetically closed chamber to obtain said low molecular weight PTFE.

F2. The method for obtaining low molecular weight PTFE according to F1, wherein besides said amount of oxygen, said controlled atmosphere contains an inert gas, preferably nitrogen, and wherein said controlled atmosphere is free of halogenated polymers, it is free pf oxygen adsorbents and it is free of hydrocarbons, chlorinated hydrocarbons, alcohols and carboxylic acids other than C8-C14 perfluorinated carboxylic acids.

F3. The method for obtaining low molecular weight PTFE according to any one of F1-F2, wherein said high molecular weight PTFE is placed in said chamber together with a gas composition corresponding to said controlled atmosphere.

F4. The method for obtaining low molecular weight PTFE according to any one of F1-F2, wherein said controlled atmosphere is created in said chamber prior to or subsequently to said step of arrangement of said high molecular weight PTFE in said chamber, before said step of irradiating said PTFE in said chamber.

F5. The method for obtaining low molecular weight PTFE according to any one of F1-F4, wherein said gas barrier has an oxygen permeability≤0.3 cc/m2/24h, preferably ≤0.1 cc/m2/24h, and a water vapour permeability≤1 cc/m2/24h, preferably ≤0.1 cc/m2/24h.

F6. The method for obtaining low molecular weight PTFE according to any one of F1-F4, wherein said gas barrier has:
an oxygen permeability≤0.1 cc/m2/24h and a water vapour permeability≤0.1 cc/m2/24h; or
an oxygen permeability≤0.2 cc/m2/24h and a water vapour permeability≤2 cc/m2/24h; or
an oxygen permeability≤0.1 cc/m2/24h and a water vapour permeability≤2 cc/m2/24h.

F7. The method for obtaining low molecular weight PTFE according to any one of F1-F6, wherein said gas barrier comprises at least one metal layer and/or a metallised polymeric layer, said gas barrier being connected to, or integrated in, a flexible bag defining said chamber.

F8. The method for obtaining low molecular weight PTFE according to any one of F1-F7, wherein said step of irradiating the PTFE in said chamber is carried out through said gas barrier to reduce an incident irradiation on said high molecular weight PTFE.

F9. The method for obtaining low molecular weight PTFE according to any one of F1-F8, wherein said amount of oxygen is comprised from 0.005% to 0.25% by volume, preferably comprised from 0.005% to 0.2% by volume, even more preferably comprised from 290 ppm to 450 ppm.

F10. The method for obtaining low molecular weight PTFE according to F9, wherein said amount of oxygen is comprised from 300 ppm to 380 ppm.

F11. The method for obtaining low molecular weight PTFE according to any one of F1-F10, wherein, during the step of irradiating said PTFE in said hermetically closed chamber, a maximum irradiation temperature is comprised from 105° C. to 118° C.

F12. The method for obtaining low molecular weight PTFE according to F11, characterized in that it does not comprise further thermal treatments on the product of the irradiation step.

F13. The method for obtaining low molecular weight PTFE according to any one of F11-F12, wherein said step of irradiating said PTFE in said hermetically closed chamber is performed in pulses, intermittently, or in irradiation steps alternating with non-irradiation steps, so as not to exceed said maximum irradiation temperature.

F14. The method for obtaining low molecular weight PTFE according to any one of F1-F13, wherein, in the step of irradiating said PTFE in said hermetically closed chamber, irradiation rates comprised from 5 kGy/h to 250 kGy/h, preferably comprised from 10 kGy to 150 kGy/h, even more preferably comprised from 50 kGy to 100 kGy/h, are used.

F15. The method for obtaining low molecular weight PTFE according to any one of F1-F14, wherein, in the step of irradiating said PTFE in said hermetically closed chamber, irradiation source irradiation doses equal to or less than 7 MeV, preferably comprised from 0.5 MeV to 7 MeV, more preferably comprised from 1 MeV to 6 MeV, even more preferably comprised from 2 MeV to 4 MeV, are used.

F16. The method for obtaining low molecular weight PTFE according to any one of F1-F15, wherein said high molecular weight PTFE is in the form of a powder or (micro-)particles with an average particle size distribution comprised from 20 µm to 700 µm, more preferably comprised from 50 µm to 500 µm, even more preferably comprised from 100 µm to 300 µm, said high molecular weight PTFE being irradiated in a controlled atmosphere containing, besides said amount of oxygen, an inert gas (for example nitrogen or helium), and free of halogenated polymers, free of oxygen adsorbents, free of hydrocarbons, chlorinated hydrocarbons, alcohols and carboxylic acids other than C8-C14 perfluorinated carboxylic acids, at a temperature comprised from 80° C. to 119° C., even more preferably comprised from 105° C. to 118° C. and with a high molecular weight PTFE exposure dose comprised from 5 kGy to 2000 kGy, preferably comprised from 25 kGy to 1600 kGy and wherein said low molecular weight PTFE obtained at the end of the irradiation step is in the form of particles with an average particle size distribution comprised from 0.1 µm to 300 µm, more preferably comprised from 0.2 µm to 100 µm, even more preferably comprised from 0.3 µm to 50 µm.

F17. Low molecular weight PTFE obtained by means of the method according to any one of F1-F16.

The invention claimed is:

1. A method for obtaining a low molecular weight polytetrafluoroethylene (PTFE) comprising the following steps:
provision of a high molecular weight PTFE;
arrangement of said high molecular weight PTFE in a chamber, delimited by a gas barrier and containing a controlled atmosphere with an amount of oxygen comprised from 0.005% to 0.5% by volume, wherein said gas barrier has an oxygen permeability≤ 0.5 cc/m2/24h (ASTM D3985-95, 23° C.-0% RH) and a water vapour permeability≤2 cc/m2/24h (ASTM F1249-90, 38° C.-90% RH);
hermetical closure of said chamber containing said high molecular weight PTFE; and
irradiation of said PTFE in said hermetically closed chamber to obtain said low molecular weight PTFE.

2. The method for obtaining low molecular weight PTFE according to claim 1, wherein said controlled atmosphere contains an inert gas, besides said amount of oxygen, and wherein said controlled atmosphere is free of halogenated polymers, it is free of oxygen adsorbents, and it is free of hydrocarbons, chlorinated hydrocarbons, alcohols and carboxylic acids other than C8-C14 perfluorinated carboxylic acids.

3. The method of claim 1, wherein said high molecular weight PTFE is placed in said chamber together with a gas composition corresponding to said controlled atmosphere.

4. The method of claim 1, wherein said controlled atmosphere is created in said chamber prior to or subsequently to said step of arrangement of said high molecular weight PTFE in said chamber, prior to said step of irradiating said PTFE in said chamber.

5. The method of claim 1, wherein said gas barrier has an oxygen permeability≤0.3 cc/m$^2$/24h.

6. The method of claim 1, wherein said gas barrier has:
an oxygen permeability≤0.1 cc/m$^2$/24h and a water vapour permeability≤0.1 cc/m$^2$/24h; or
an oxygen permeability≤0.2 cc/m$^2$/24h and a water vapour permeability≤2 cc/m$^2$/24h; or
an oxygen permeability≤0.1 cc/m$^2$/24h and a water vapour permeability≤2 cc/m$^2$/24h.

7. The method of claim 1, wherein said gas barrier comprises at least one metal layer and/or a metallised polymer layer, said gas barrier being connected to, or integrated in, a flexible bag delimiting said chamber.

8. The method of claim 1, wherein said step of irradiation of the PTFE in said chamber is carried out through said gas barrier to dampen an irradiation incident on said high molecular weight PTFE.

9. The method of claim 1, wherein said amount of oxygen is comprised from 0.005% to 0.25% by volume.

10. The method of claim 9, wherein said amount of oxygen is comprised from 300 ppm to 380 ppm.

11. The method of claim 1, wherein, in the step of irradiation of said PTFE in said hermetically closed chamber, a maximum irradiation temperature is comprised from 105° C. to 118° C.

12. The method of claim 11, characterised in that it does not comprise further thermal treatments on the product of the irradiation step.

13. The method of claim 11, wherein said step of irradiation of said PTFE in said hermetically closed chamber is performed with pulses, intermittently, or in irradiation steps alternating with non-irradiation steps, so as not to exceed said maximum irradiation temperature.

14. The method of claim 1, wherein, in the step of irradiation of said PTFE in said hermetically closed chamber, irradiation rates comprised from 5 kGy/h to 250 kGy/h.

15. The method of claim 1, wherein, in the step of irradiation of said PTFE in said hermetically closed chamber, irradiation doses of an irradiation source equal to or less than 7 MeV are used.

16. The method of claim 1, wherein said high molecular weight PTFE is in the form of powder or (micro-)particles with an average particle size distribution comprised from 20 μm to 700 μm, said high molecular weight PTFE being irradiated in a controlled atmosphere containing, besides said amount of oxygen, an inert gas, and free of halogenated polymers, free of oxygen adsorbents, free of hydrocarbons, chlorinated hydrocarbons, alcohols and carboxylic acids other than C8-C14 perfluorinated carboxylic acids, at a temperature comprised from 75° C. to 120° C. and with a high molecular weight PTFE exposure dose comprised from 5 kGy to 2000 kGy and wherein said low molecular weight PTFE obtained at the end of the irradiation step is in the form of particles with an average particle size distribution comprised from 0.1 μm to 300 μm.

* * * * *